US012608797B2

(12) United States Patent
Tsai et al.

(10) Patent No.: US 12,608,797 B2
(45) Date of Patent: Apr. 21, 2026

(54) MEDICAL IMAGE DETECTION SYSTEM, TRAINING METHOD AND MEDICAL ANALYZATION METHOD

(71) Applicant: HTC Corporation, Taoyuan City (TW)

(72) Inventors: Chen-Han Tsai, Taoyuan City (TW); Yu-Shao Peng, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 409 days.

(21) Appl. No.: 18/176,497

(22) Filed: Mar. 1, 2023

(65) Prior Publication Data

US 2023/0316511 A1    Oct. 5, 2023

Related U.S. Application Data

(60) Provisional application No. 63/268,703, filed on Mar. 1, 2022.

(51) Int. Cl.
*G06T 7/00*        (2017.01)
*G06T 5/50*        (2006.01)
(Continued)

(52) U.S. Cl.
CPC .............. *G06T 7/0012* (2013.01); *G06T 5/50* (2013.01); *G06V 10/25* (2022.01); *G06V 10/454* (2022.01);
(Continued)

(58) Field of Classification Search
CPC .......... G06T 7/00; G06T 7/0012; G06T 5/50; G06T 2207/10081; G06T 2207/10088;
(Continued)

(56) References Cited

U.S. PATENT DOCUMENTS 10,783,640 B2 *    9/2020    Chen .......................... G06T 7/12
11,334,766 B2    5/2022    Li et al.
(Continued)

FOREIGN PATENT DOCUMENTS

CN    113724187 A    11/2021
CN    114092414 A    2/2022
TW    I735187 B    8/2021

OTHER PUBLICATIONS

Zhang, Zhengdong, et al. "A novel and efficient tumor detection framework for pancreatic cancer via CT images." 2020 42nd annual international conference of the IEEE engineering in medicine & biology society (EMBC). IEEE, 2020. (Year: 2020).*
(Continued)

*Primary Examiner* — Oneal R Mistry
*Assistant Examiner* — Duy Tran
(74) *Attorney, Agent, or Firm* — CKC & Partners Co., LLC

(57)        ABSTRACT

A medical image detection system includes a memory and a processor. The processor is configured to execute the neural network model stored in the memory. The neural network model includes a feature extractor, a feature pyramid network, a first output head and a second output head. The feature extractor is configured for extracting intermediate tensors from a medical image. The feature pyramid network is associated with the feature extractor. The feature pyramid network is configured for generating multi-resolution feature maps according to the intermediate tensors. The first output head is configured for generating a global prediction according to the multi-resolution feature maps. The second output head is configured for generating local predictions according to the multi-resolution feature maps. The processor is configured to generate output information based on the
(Continued)

200 providing a medical image — S210 extracting intermediate tensors from the medical image — S220 generating multi-resolution feature maps according to the intermediate tensors — S230

S240 — generating a global prediction according to the multi-resolution feature maps S242 — generating local predictions according to the multi-resolution feature maps generating output information based on the medical image, the global prediction and the local predictions — S250 medical image, the global prediction and the local predictions.

8 Claims, 12 Drawing Sheets

(51) Int. Cl.

| | |
|---|---|
| *G06V 10/25* | (2022.01) |
| *G06V 10/44* | (2022.01) |
| *G06V 10/764* | (2022.01) |
| *G06V 10/771* | (2022.01) |
| *G06V 10/82* | (2022.01) |

(52) U.S. Cl.
CPC .......... *G06V 10/764* (2022.01); *G06V 10/771* (2022.01); *G06V 10/82* (2022.01); *G06T 2207/10081* (2013.01); *G06T 2207/10088* (2013.01); *G06T 2207/20016* (2013.01); *G06T 2207/20221* (2013.01); *G06T 2207/30096* (2013.01); *G06V 2201/07* (2022.01)

(58) Field of Classification Search
CPC . G06T 2207/20016; G06T 2207/20221; G06T 2207/30096; G06T 2207/10104; G06T 2207/30016; G06T 2207/30061; G06V 10/25; G06V 10/44; G06V 10/454; G06V 10/764; G06V 10/771; G06V 10/82; G06V 10/40; G06V 10/774; G06V 2201/07
See application file for complete search history.

(56) References Cited

U.S. PATENT DOCUMENTS

| | | | | |
|---|---|---|---|---|
| 2017/0124415 A1* | 5/2017 | Choi | ...................... | G06V 10/25 |
| 2019/0139216 A1* | 5/2019 | Georgescu | ............ | G06N 3/048 |
| 2020/0111214 A1* | 4/2020 | Chen | ...................... | G06T 7/143 |
| 2020/0349394 A1* | 11/2020 | Zhao | ................... | G06V 10/764 |
| 2021/0225511 A1 | 7/2021 | Kiraly et al. | | |
| 2021/0365724 A1* | 11/2021 | Lee | ........................... | G06T 7/73 |
| 2022/0180514 A1 | 6/2022 | Vlasimsky | | |

OTHER PUBLICATIONS

Li, Ce, et al. "Deformation and refined features based lesion detection on chest X-ray." IEEE Access 8 (2020): 14675-14689. (Year: 2020).*

Zhengdong Zhang et al., "A Novel and Efficient Tumor Detection Framework for Pancreatic Cancer via CT Images", 2020 42nd Annual International Conference of the IEEE Engineering in Medicine & Biology Society (EMBC), 2020, pp. 1160-1164.

The office action of the corresponding Japanese application No. JP2023-030623 issued on Apr. 2, 2024.

The office action of the corresponding Chinese application No. CN202310184531.X issued on Nov. 6, 2025.

\* cited by examiner

MEDICAL IMAGE DETECTION SYSTEM, TRAINING METHOD AND MEDICAL ANALYZATION METHOD

RELATED APPLICATIONS

This application claims the priority benefit of U.S. Provisional Application Ser. No. 63/268,703, filed Mar. 1, 2022, which is herein incorporated by reference.

BACKGROUND

Field of Invention

The disclosure relates to a medical image detection system and training method thereof. More particularly, the disclosure relates to a medical image detection system capable of generating a global prediction about an overall view of a medical image and local predictions about local regions within the medical image.

Description of Related Art

Several medical imaging technologies are widely used in diagnosing diseases or examining health conditions on patients. For example, X-ray imaging, computed tomography (CT) imaging and a magnetic resonance imaging (MRI) can provide critical information while diagnosing a cancer, a fracture, an internal bleeding and other symptoms. Normally, it requires an experienced doctor or an expert to look into outcome images generated by these medical imaging technologies, and to determine whether the outcome images are normal or abnormal.

Among different diseases, lung cancer ranks among the top causes of cancer-related deaths worldwide. Pulmonary nodule findings, though typically benign, are an alarming sign for potential lung cancer. Given its simple and inexpensive operating cost, chest radiography (also known as x-rays) is the most widely-adopted chest imaging solution available. One concern of x-rays is the proportion of nodules thoracic radiologists oftentimes miss due to the nature of the imaging modality. A chest x-ray is a 2D projection of a patients' chest. Thus, nodules appear less visible when occluded by other organs (e.g., rib cage) or foreign bodies. With the rising workload already posing a challenge for thoracic radiologists, assistive tools are demanded to reduce missed nodules during chest radiograph analysis.

SUMMARY

An embodiment of the disclosure provides a medical image detection system, which includes a memory and a processor. The memory is configured for storing a neural network model. The processor is coupled with the memory. The processor is configured to execute the neural network model. The neural network model includes a feature extractor, a feature pyramid network, a first output head and a second output head. The feature extractor is configured for extracting a plurality of intermediate tensors from a medical image. Each of the intermediate tensors has a resolution respectively. The feature pyramid network (FPN) is associated with the feature extractor. The feature pyramid network is configured for generating multi-resolution feature maps according to the intermediate tensors. The first output head is configured for generating a global prediction according to the multi-resolution feature maps. The global prediction indicates whether any target object exists in the medical image. The second output head is configured for generating local predictions according to the multi-resolution feature maps. Each of the local predictions indicates a target object predicted location in the medical image. The processor is configured to generate output information based on the medical image, the global prediction and the local predictions.

An embodiment of the disclosure provides a training method, which is suitable for training a neural network model executed by a medical image detection system. The training method includes: providing a medical image and a training ground about the medical image; performing a first image augmentation to the medical image to generate a first augmented medical image; performing a second image augmentation to the medical image to generate a second augmented medical image; generating a global prediction, by a first output head of the neural network model, according to the first augmented medical image; generating local predictions, by a second output head of the neural network model, according to the second augmented medical image; calculating a global loss by comparing the global prediction with the training ground; calculating a local loss by comparing the local predictions with the training ground; and, updating the neural network model by back-propagation according to the global loss and the local loss.

An embodiment of the disclosure provides a medical analyzation method, which is performed by a medical image detection system executing a neural network model. The medical analyzation method includes: obtaining a medical image; extracting, by a feature extractor of the neural network model, a plurality of intermediate tensors from the medical image, each of the intermediate tensors having a resolution respectively; generating, by a feature pyramid network of the neural network model, a plurality of multi-resolution feature maps according to the intermediate tensors; generating, by a first output head of the neural network model, a global prediction according to the multi-resolution feature maps, the global prediction indicating whether any target object exists in the medical image; generating, by a second output head of the neural network model, a plurality of local predictions according to the multi-resolution feature maps, each of the local predictions indicating a target object predicted location in the medical image; and, generating output information based on the medical image, the global prediction and the local predictions.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
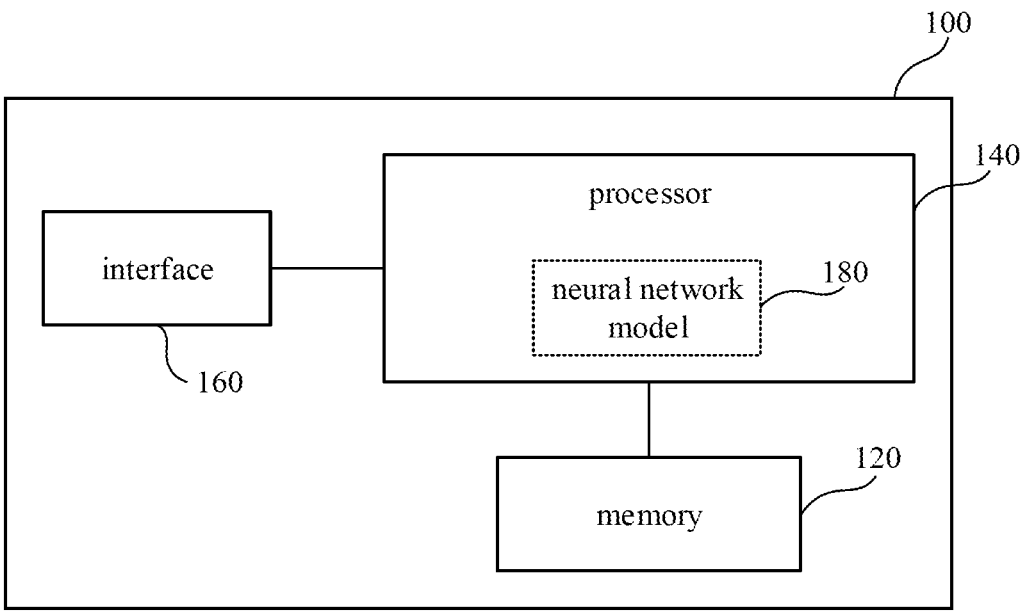
FIG. 1 is a schematic diagram illustrating a medical image detection system according to some embodiments of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a medical image detection system 100 according to some embodiments of this disclosure. In practical applications, the medical image detection system 100 is configured to detect or predict a presence of a target object in a medical image, and the result can be beneficial in examining, evaluating or diagnosing a patient based on the medical image.

As shown in FIG. 1, the medical image detection system 100 includes a memory 120, a processor 140 and an interface 160. The memory 120 is configured to store some computer-executable instructions, which can be executed by the processor 140. In some embodiments, the memory 120 can include a dynamic memory, a static memory, a hard-drive and/or a flash memory. The interface 160 is configured to receive input data (e.g., an input medical image, an instruction, a voice command or a keyboard input) and/or display output content. In some embodiments, the interface 160 may include a keyboard, a displayer, a touch panel, a microphone, a network transceiver, a speaker, etc. The processor 140 is coupled with the memory 120 and the interface 160. In some embodiments, the processor 140 is configured to execute a neural network model 180. Data or parameters of the neural network model 180 can be stored in the memory 120. In some embodiments, the processor 140 can include a central processing unit (CPU), a graphic processing unit (GPU), a tensor processing unit (TPU), an application specific integrated circuit (ASIC) or any equivalent processing circuit.

Figure 2:
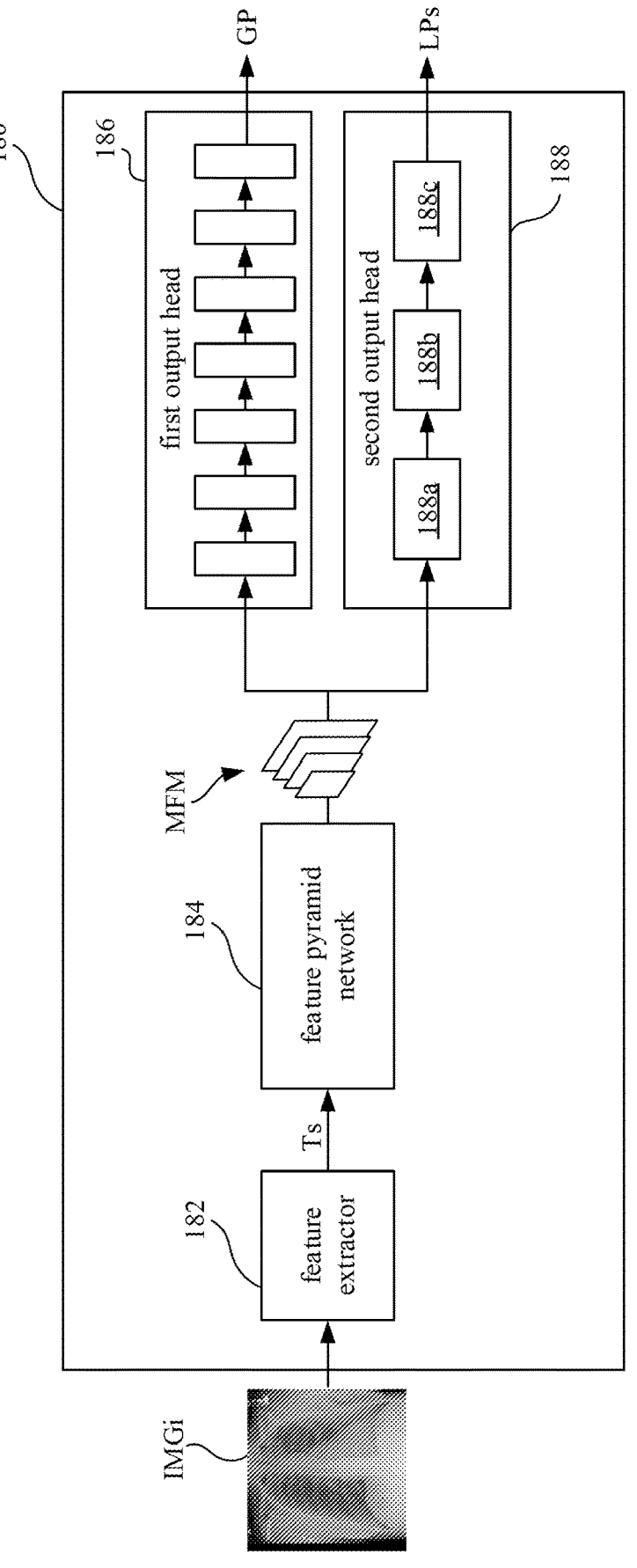
FIG. 2 is a schematic diagram illustrating a structure of the neural network model according to some embodiment of the disclosure.

Reference is further made to FIG. 2, which is a schematic diagram illustrating a structure of the neural network model 180 according to some embodiment of the disclosure. The neural network model 180, executed by the processor 140, is configured to detect a medical image IMGi and generate a global prediction GP and some local prediction LPs about the medical image IMGi. In some embodiments, the global prediction GP indicates whether any target object exists in the medical image IMGi, and each of the local predictions LPs indicates a target object predicted location in the medical image IMGi.

In some embodiments, the medical image IMGi can be an X-ray image, a computed tomography (CT) image or a magnetic resonance imaging (MRI) image about a chest region, an abdominal region or a head region on the patient. In some embodiments, the target object can be a nodule and/or a tumor carried by the patient and appeared in the medical image. For brevity, the medical image IMGi discussed in the following paragraphs is assumed to be the X-ray image about the chest region, and the target object is assumed to be a nodule.

Aforesaid combination (i.e., detecting nodules from a chest X-ray image) is a demonstrational application of the neural network model 180, and the disclosure is not limited to this.

Figure 3:
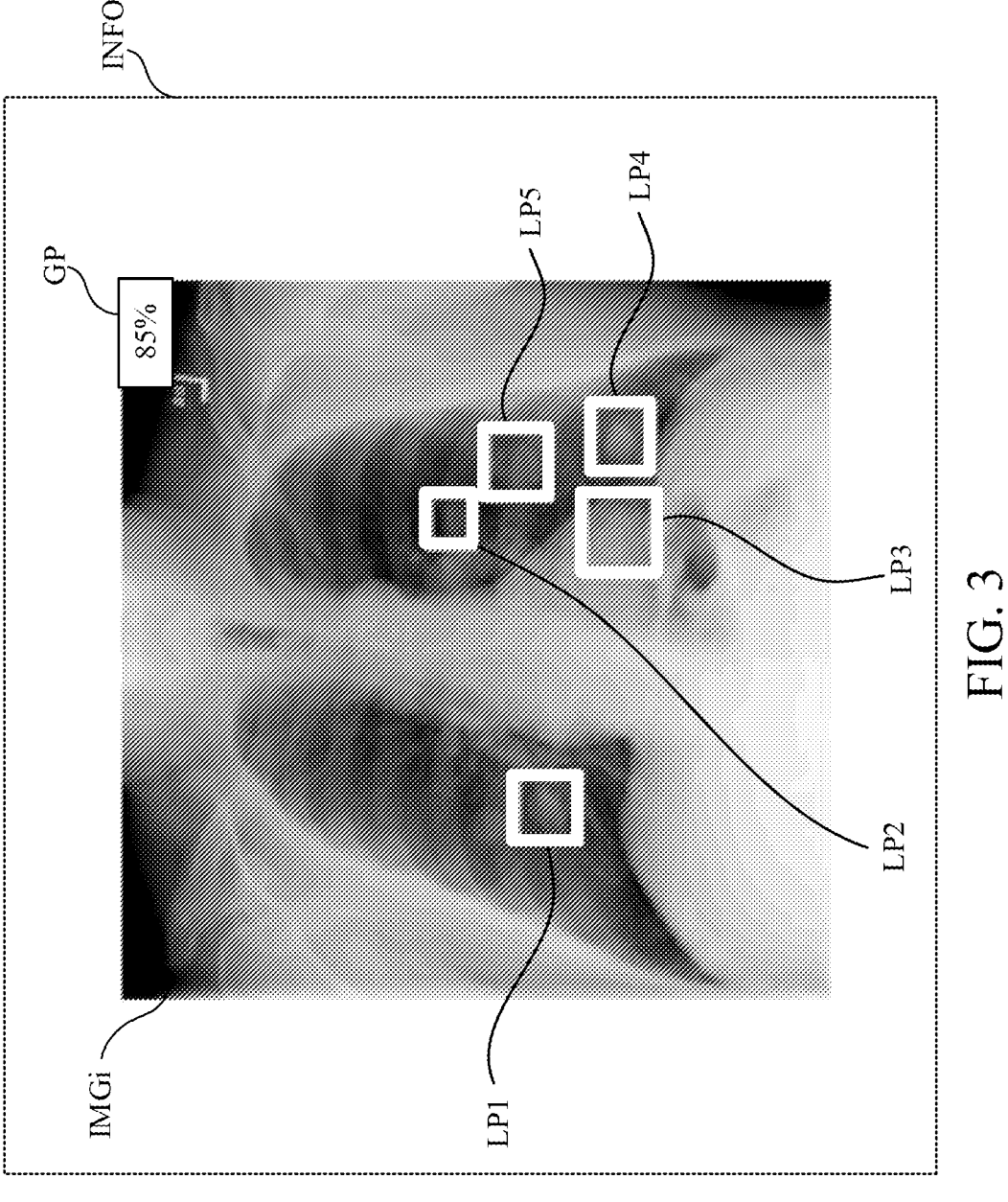
FIG. 3 is a schematic diagram illustrating the global prediction and the local predictions generated by the neural network model corresponding to the medical image according to some embodiment of the disclosure.

In this case, the global prediction GP generated by the neural network model 180 is about whether the medical image IMGi carries any nodule, and the local predictions LPs generated by the neural network model 180 are about predicted locations of the nodules in the medical image IMGi. Reference is further made to FIG. 3, which is a schematic diagram illustrating the global prediction GP and the local predictions LPs generated by the neural network model 180 corresponding to the medical image IMGi according to some embodiment of the disclosure. As shown in FIG. 3, the global prediction GP evaluated by the neural network model 180 can be a probability label, 85%, indicating that the medical image IMGi has a high probability of including at least one nodule. As shown in FIG. 2 and FIG. 3, the local predictions LPs, including five local predictions LP1, LP2, LP3, LP4 and LP5 in this embodiment, generated by the neural network model 180 are configured to mark five possible locations and regions of nodules in the medical image IMGi. In this case, a local prediction LP1 includes a local bounding box showing a position and a size of one predicted nodule in the medical image IMGi. Another local prediction LP2 includes a local bounding box showing a position and a size of another predicted nodule in the medical image IMGi. Similarly, the local predictions LP3, LP4 and LP5 show other three local bounding boxes.

Figure 4:
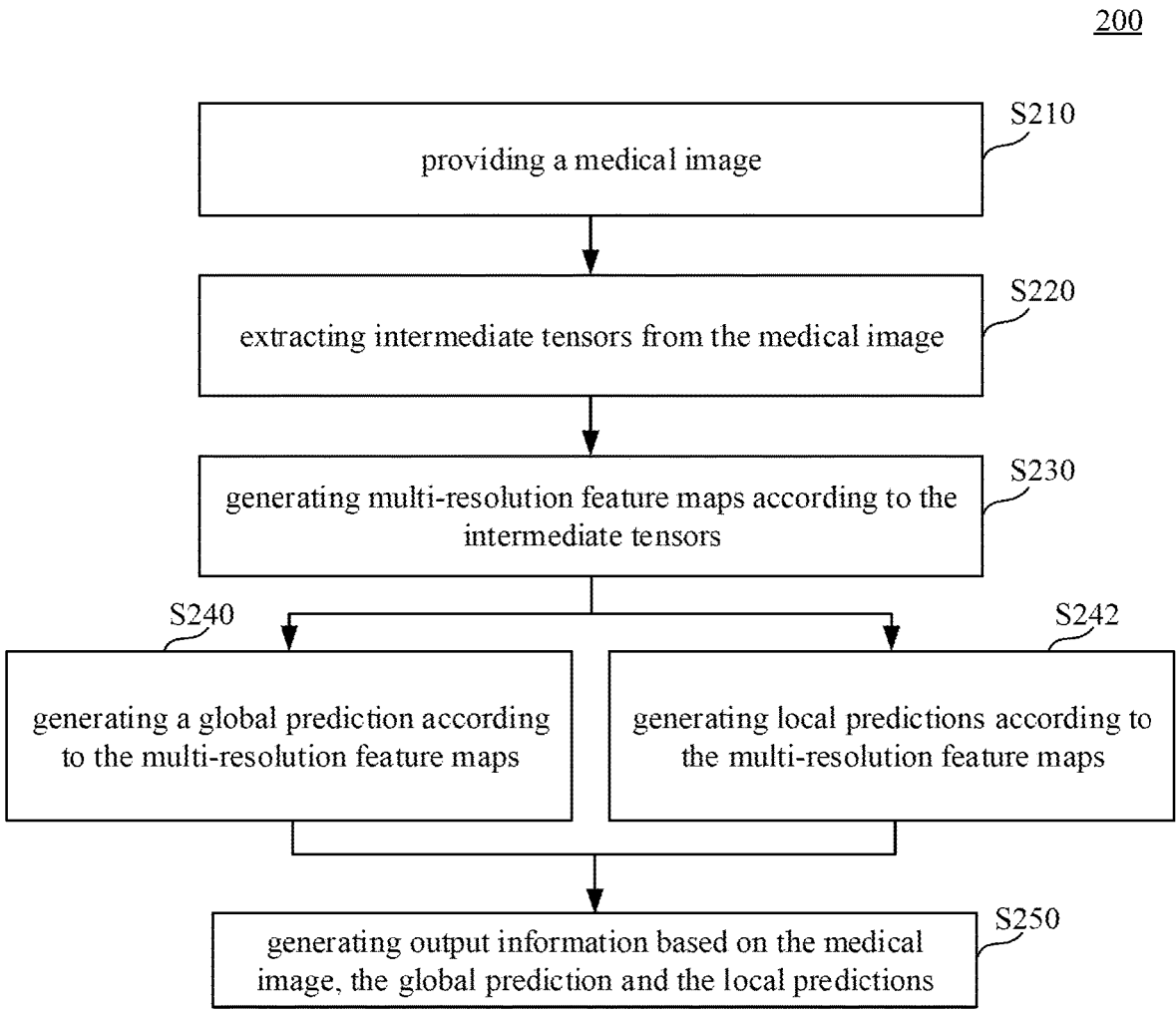
FIG. 4 is a flow chart diagram illustrating a medical analyzation method executed by the medical image detection system and the neural network model shown in FIG. 1 and FIG. 2 according to some embodiments.

The neural network model 180 in this disclosure provides a multi-task lung nodule detection algorithm using a Dual Head Network (DHN) for generating global prediction GP and the local predictions LPs simultaneously. As shown in FIG. 2, the neural network model 180 includes a feature extractor 182, a feature pyramid network 184, a first output head 186 and a second output head 188. Reference is further made to FIG. 4, which is a flow chart diagram illustrating a medical analyzation method 200 executed by the medical image detection system 100 and the neural network model 180 shown in FIG. 1 and FIG. 2 according to some embodiments.

In some embodiments, the feature extractor 182, the feature pyramid network 184, the first output head 186 and the second output head 188 are software function blocks of the in the neural network model 180, and each of them can be implemented by software programs or computer-executable instructions. Details of software structures in the feature extractor 182, the feature pyramid network 184, the first output head 186 and the second output head 188 will be discussed in following paragraphs.

As shown in FIG. 1, FIG. 2 and FIG. 4, step S210 is executed to provide the medical image IMGi to the feature extractor 182 of the neural network model 180. In some embodiments, the medical image IMGi can be an X-ray image captured on a patient's chest region. If the patient has a lung cancer, one or more nodule may appear in the medical image IMGi. If the patient has a healthy lung, the medical image IMGi may not include any nodule.

Figure 5:
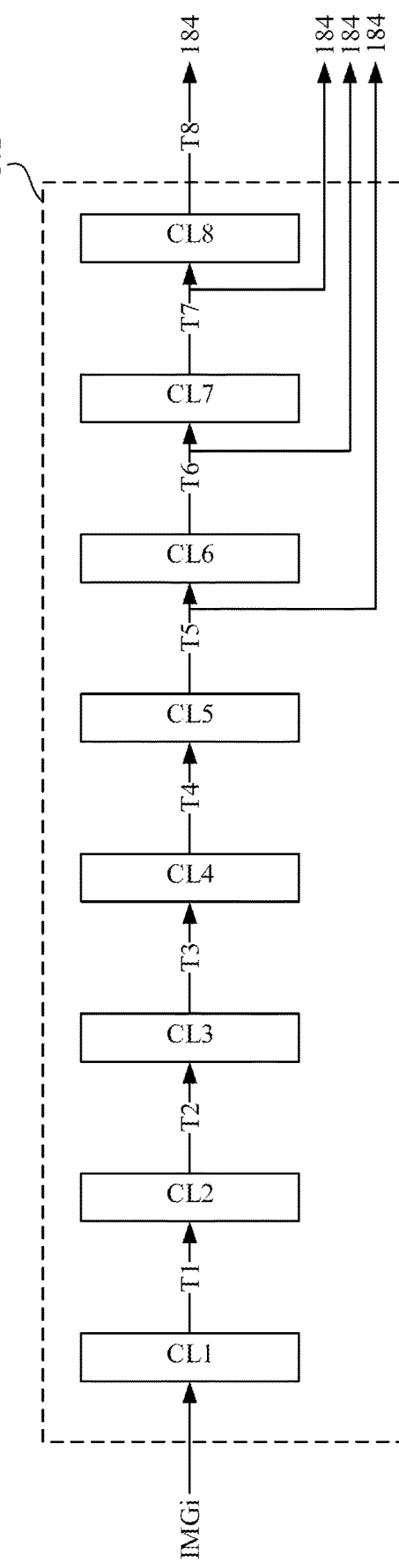
FIG. 5 is a schematic diagram illustrating an internal structure of the feature extractor in FIG. 2 according to some embodiments.

As shown in FIG. 1, FIG. 2 and FIG. 4, step S220 is executed to extract intermediate tensors Ts from the medical image IMGi by the feature extractor 182 of the neural network model 180. Reference is further made to FIG. 5, which is a schematic diagram illustrating an internal structure of the feature extractor 182 in FIG. 2 according to some embodiments. The feature extractor 182 includes some convolutional layers for generating intermediate tensors from the medical image IMGi. In embodiments shown in FIG. 5, the feature extractor 182 includes eight convolutional layers CL1-CL8 coupled in sequence. The convolutional layer CL1 may include some convolutional kernels on different channels and the convolutional layer CL1 can be utilized to perform convolution calculations on the medical image IMGi and generate an intermediate tensor T1. The intermediate tensor T1 generated by the convolutional layer CL1 is transmitted to the convolutional layer CL2, and the convolutional layer CL2 can be utilized to perform convolution calculations on the intermediate tensor T1 and generate an intermediate tensor T2. Similarly, the convolutional layers CL3-CL8 are utilized to perform convolution calculations sequentially and generate intermediate tensors T3-T8 respectively.

In some embodiments, the feature extractor 182 may further include some pooling layers (not shown in figures) and/or some activation layers (not shown in figures) among these convolutional layers CL1-CL8. Due to the convolutional layers CL1-CL8 may use different sampling rates and effects of the pooling layers, each of the intermediate tensors T1-T8 may has a resolution different from each other's. For example, the intermediate tensor T5 may have a spatial resolution at 128×128; the intermediate tensor T6 may have a spatial resolution at 64×64; the intermediate tensor T7 may have a spatial resolution at 32×32; and, the intermediate tensor T8 may have a spatial resolution at 16×16. These resolutions of the intermediate tensors are affected by sampling parameters of the convolutional layers CL5-CL8 and pooling layers between these convolutional layers CL5-CL8, and are not limited to specific numbers.

In this case, the intermediate tensor T5 has a relatively higher spatial resolution at 128×128, compared to the intermediate tensor T6 at 64×64. The intermediate tensor T6 has a relatively higher spatial resolution at 64×64, compared to the intermediate tensor T7 at 32×32. The intermediate tensor T7 has a relatively higher spatial resolution at 32×32, compared to the intermediate tensor T8 at 16×16. Each element in the intermediate tensor T5 tends to represent a concrete and local feature in a relatively smaller region corresponding to the medical image IMGi. Each element in the intermediate tensor T8 tends to represent an abstract feature in a relatively wider region corresponding to the medical image IMGi.

Figure 6A:
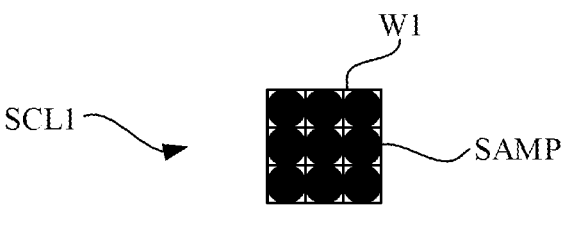
FIG. 6A, FIG. 6B and FIG. 6C are schematic diagrams illustrating distributions of sampling points in sample windows on standard convolution layers.
Figure 6B:
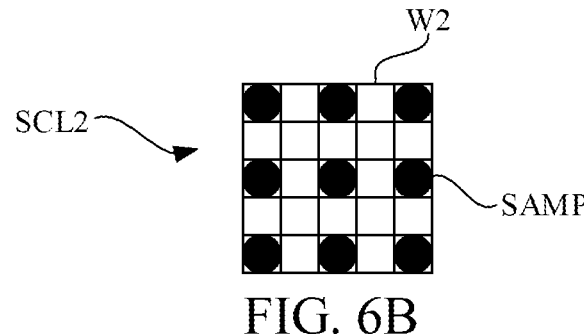
Figure 6C:
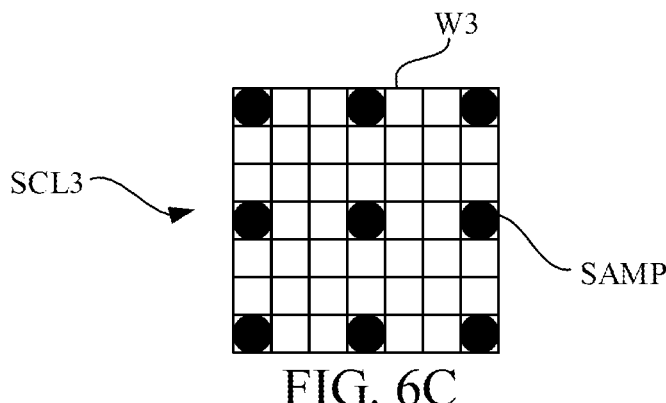

In some embodiments, some of the convolutional layers CL1-CL8 may adopt deformable convolution layers, which are different from standard convolution layers. On a standard convolution layer, the sampling points of the standard convolution layer are distributed evenly in a sample window of the standard convolution layer. Reference is made to FIG. 6A, FIG. 6B and FIG. 6C, which are schematic diagrams illustrating distributions of sampling points in sample windows W1-W3 on standard convolution layers SCL1-SCL3. As shown in FIG. 6A, every elements in the sample window W1 of the standard convolution layer SCL1 are selected as sampling points SAMP. As shown in FIG. 6B, sampling points SAMP are separated with a gap distance "1" and evenly distributed in the sample window W2 of the standard convolution layer SCL2. As shown in FIG. 6C, sampling points SAMP are separated with another gap distance "2" and evenly distributed in the sample window W3 of the standard convolution layer SCL3.

Figure 6D:
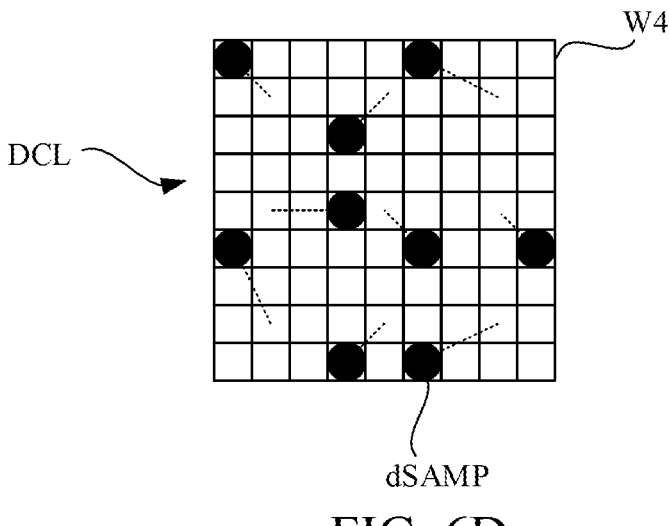
FIG. 6D is a schematic diagram illustrating a distribution of sampling points in the sample windows on a deformable convolution layer according to some embodiments.

Reference is made to FIG. 6D, which is a schematic diagram illustrating a distribution of sampling points in a sample window W4 on a deformable convolution layer DCL. As shown in FIG. 6D, sampling points dSAMP of the deformable convolution layer DCL are shifted from its original positions with different displacement vectors. The sampling points dSAMP are not evenly distributed in a sample window W4 of the deformable convolution layer DCL.

Receptive fields of the convolution layers are fixed if the standard convolution (e.g., the standard convolution layer SCL1-SCL3 shown in FIG. 6A-FIG. 6C) is applied. On the other hands, the deformable convolution can provide dynamic receptive fields while detecting regions of interest (i.e., the nodule). In practical applications, because a shape or a contour of the nodule may vary from time to time, the deformable convolution is helpful in finding image features of the nodule. In some embodiments, the last three layers (e.g., convolutional layers CL6-CL8) of the convolutional layers CL1-CL8 of the feature extractor 182 are deformable convolution layers (referring to the deformable convolution layer DCL shown in FIG. 6D), and other convolutional layers CL1-CL5 are standard convolution layers (referring to the standard convolution layer SCL1-SCL3 shown in FIG. 6A to FIG. 6C).

Figure 7:
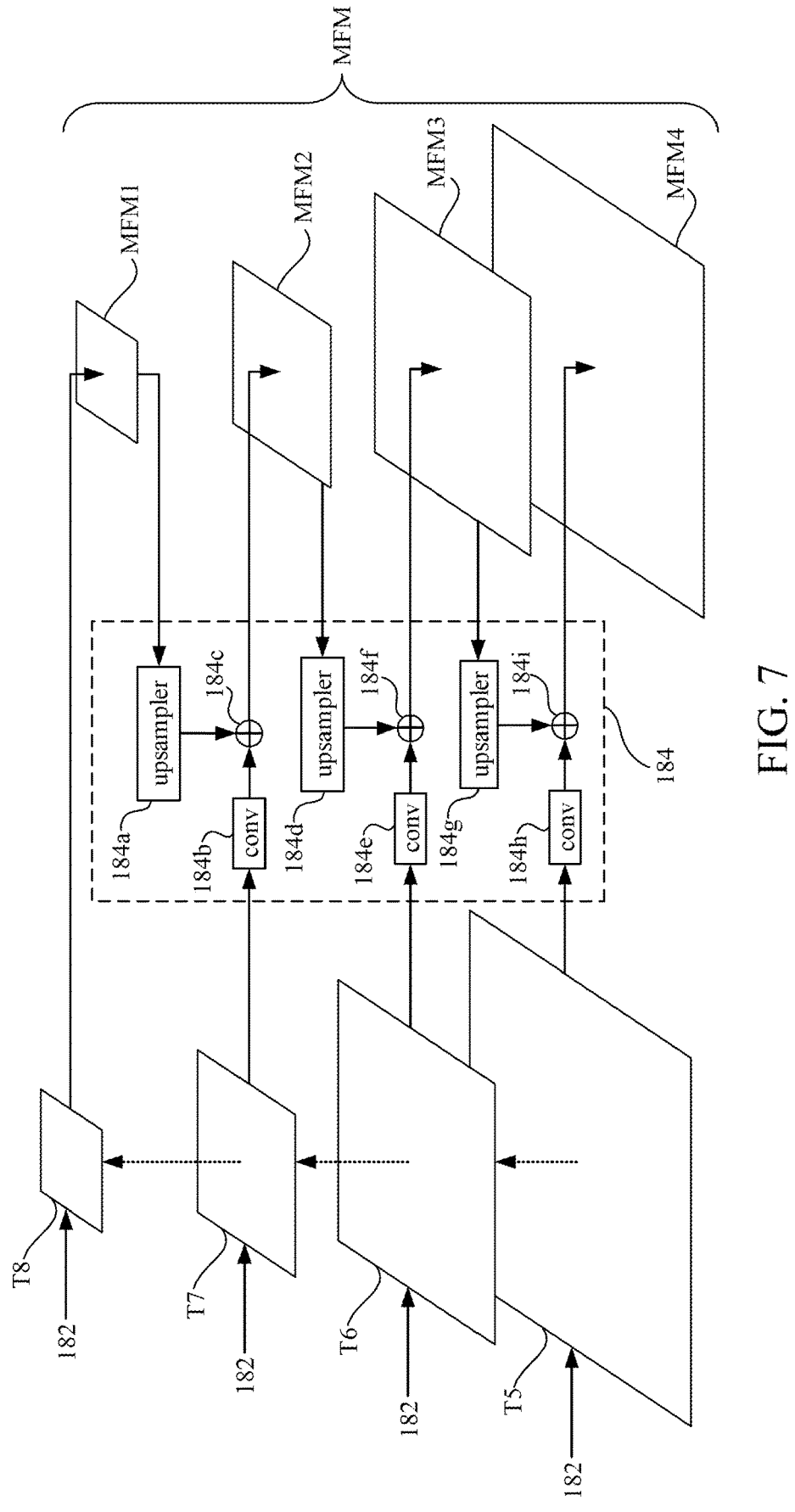
FIG. 7 is a schematic diagram illustrating an internal structure of the feature pyramid network in FIG. 2 according to some embodiments.

As shown in FIG. 1, FIG. 2 and FIG. 4, step S230 is executed, by the feature pyramid network (FPN) 184, to generate multi-resolution feature maps MFM according to the intermediate tensors T5-T8. The feature pyramid network (FPN) 184 is coupled to and associated with the feature extractor 182. Reference is further made to FIG. 7, which is a schematic diagram illustrating an internal structure of the feature pyramid network 184 in FIG. 2 according to some embodiments.

In some embodiments, the feature pyramid network (FPN) 184 receives the intermediate tensors T5-T8 from the feature extractor 182 and generate the multi-resolution feature maps MFM accordingly. As embodiments shown in FIG. 7, the feature pyramid network 184 includes a set of an upsampler 184*a*, a 1×1 convolutional layer 184*b* and an adder 184*c* between two adjacent intermediate tensors T7 and T8.

In some embodiments, the intermediate tensor T8 (with spatial resolution at 16×16) generated by the feature extractor 182 can be duplicated as a multi-resolution feature map MFM1. The multi-resolution feature map MFM1 (based on the intermediate tensor T8) is upsampled by the upsampler 184*a* into 32×32. The intermediate tensor T7 (with spatial resolution at 32×32) is processed by the 1×1 convolutional layer 184*b*. The adder 184*c* is configured to merge the intermediate tensor T7 (after 1×1 convolution) and the upsampled multi-resolution feature map MFM1 into a multi-resolution feature map MFM2 with spatial resolution at 32×32. In this case, the multi-resolution feature map MFM2 will carry features from the intermediate tensor T8 and also features from the intermediate tensor T7. In other words, the multi-resolution feature map MFM2 is generated based on two intermediate tensors T7 and T8 with different spatial resolutions (e.g., 32×32 and 16×16).

Similarly, the feature pyramid network 184 further includes a set of an upsampler 184*d*, a 1×1 convolutional layer 184*e* and an adder 184*f* between two adjacent intermediate tensors T6 and T7. In this case, the multi-resolution feature map MFM2 is upsampled by the upsampler 184*d* into 64×64. The intermediate tensor T6 (with spatial resolution at 64×64) is processed by the 1×1 convolutional layer 184*e*. The adder 184*f* is configured to merge the intermediate tensor T6 (after 1×1 convolution) and the upsampled multi-resolution feature map MFM2 into a multi-resolution feature map MFM3 with spatial resolution at 64×64. In this case, the multi-resolution feature map MFM3 will carry features from the intermediate tensor T8, the intermediate tensor T7 and the intermediate tensor T6. In other words, the multi-resolution feature map MFM3 is generated based on three intermediate tensors T6, T7 and T8 with different spatial resolutions (e.g., 64×64, 32×32 and 16×16).

Similarly, the feature pyramid network 184 further includes a set of an upsampler 184*g*, a 1×1 convolutional layer 184*h* and an adder 184*i* for generate the multi-resolution feature map MFM4. The multi-resolution feature map MFM4 will carry features from the intermediate tensor T8, the intermediate tensor T7, the intermediate tensor T6 and the intermediate tensor T5. In other words, the multi-resolution feature map MFM4 is generated based on three intermediate tensors T5, T6, T7 and T8 with different spatial resolutions (e.g., 128×128, 64×64, 32×32 and 16×16).

In this case, the multi-resolution feature maps MFM2, MFM3 and MFM4 are generated according to at least two of the intermediate tensors T5-T8 with different resolutions. The multi-resolution feature maps MFM will carries detection features from several intermediate tensors with different resolutions, and the multi-resolution feature maps MFM are beneficial in finding nodules with different size scales.

The feature pyramid network 184 as shown in aforesaid embodiments shown in FIG. 7 is demonstrated as including three sets between four levels of the intermediate tensors T5-T8 for generating four multi-resolution feature maps MFM1-MFM4. The disclosure is not limited to this specific example. The feature pyramid network 184 may include different amounts of layers in some other embodiments.

Figure 8:
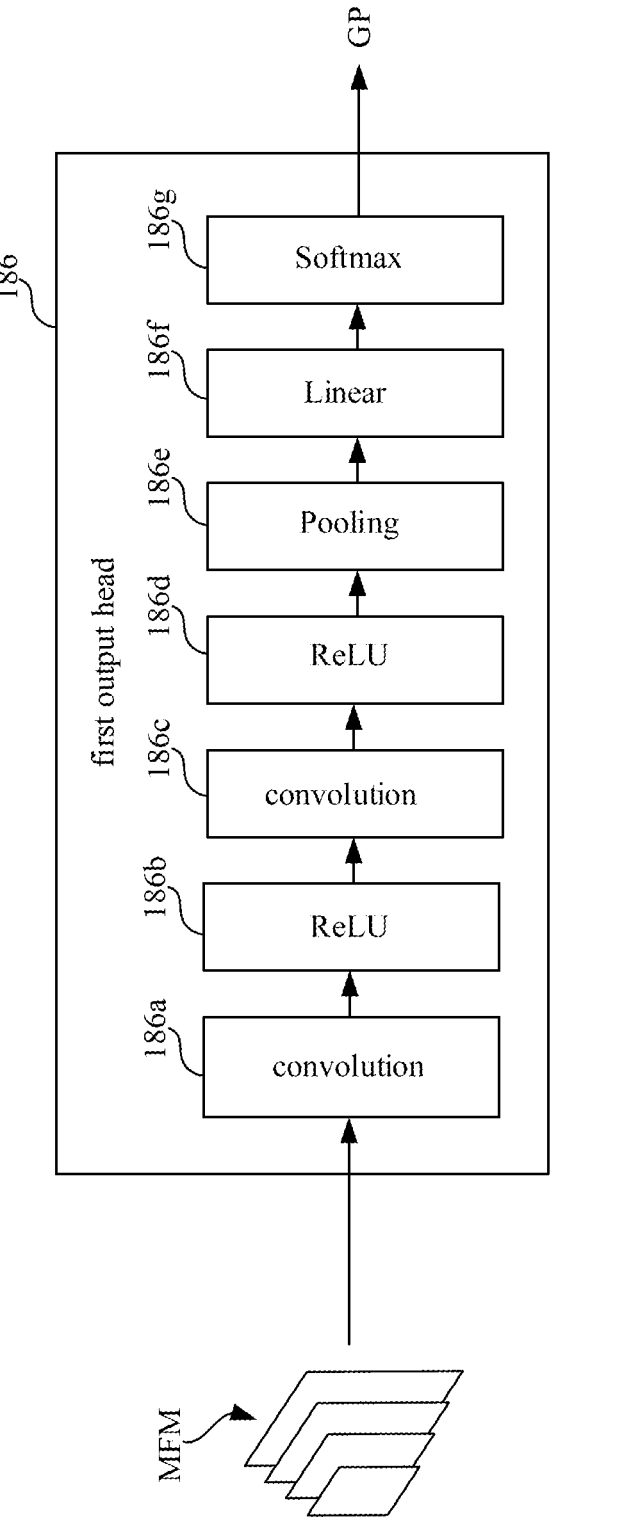
FIG. 8 is a schematic diagram illustrating an internal structure of the first output head in FIG. 2 according to some embodiments.

As shown in FIG. 2 and FIG. 4, in some embodiments, the multi-resolution feature maps MFM are simultaneously transmitted to the first output head 186 and the second output head 188. Step S240 is executed, by the first output head 186, to generate the global prediction GP according to the multi-resolution feature maps MFM. The global prediction GP indicates whether any nodule exists in the medical image IMGi. Reference is further made to FIG. 8, which is a schematic diagram illustrating an internal structure of the first output head 186 in FIG. 2 according to some embodiments. In some embodiments, the first output head 186 may include some convolutional layers 186*a* and 186*c*, some rectified linear units (ReLU) 186*b* and 186*d*, a pooling layer 186*e* and a linear layer 186*f* and a Softmax layer 186*g*.

As shown in FIG. 8, the multi-resolution feature maps MFM are inputted to the first output head 186. The multi-resolution feature maps MFM passes the convolutional layer 186*a*, the rectified linear unit 186*b*, the convolutional layer 186*c* and the rectified linear unit 186*d* before being max-pooled by the pooling layer 186*e* into a single vector. The linear layer 186*f* and the Softmax layer 186*g* are applied on the single vector to obtain a probability indicating nodule presence in the scan. In some embodiments, the global prediction GP generated by the first output head 186 is represented as the probability label, 85%, as shown in FIG. 3.

Figure 9:
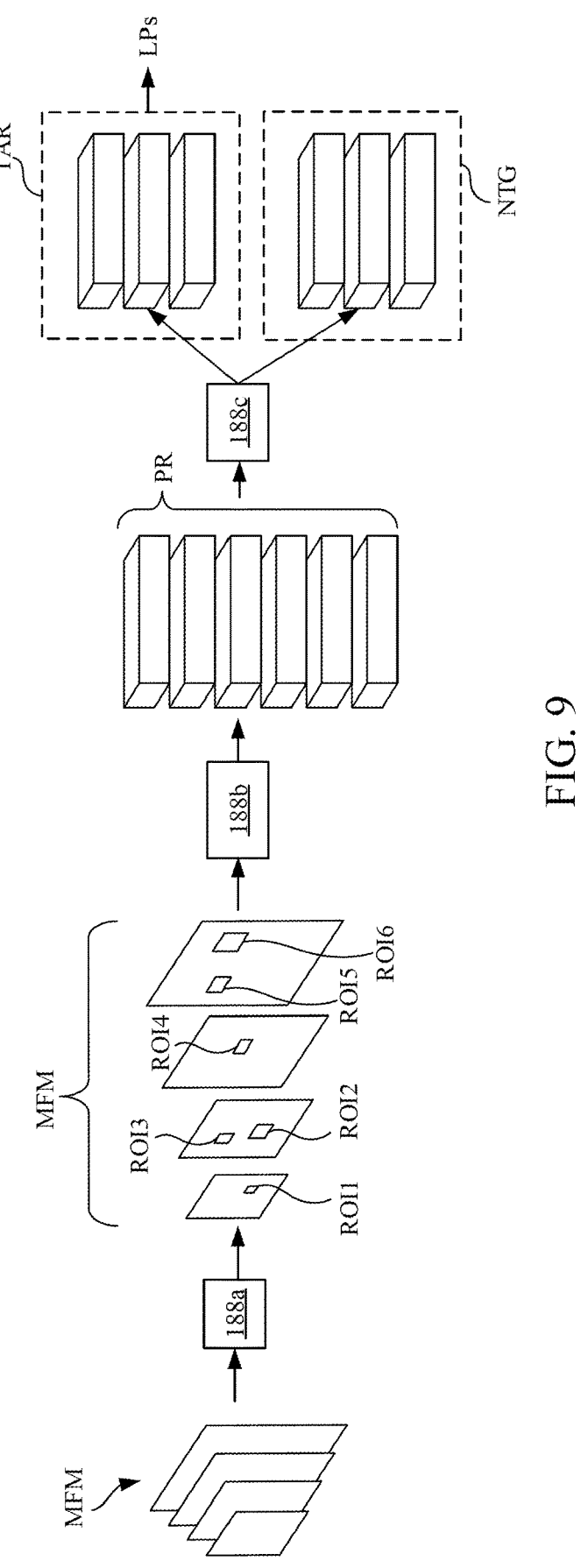
FIG. 9 is a schematic diagram illustrating the behaviors of the second output head according to some embodiments of the disclosure.

As shown in FIG. 2 and FIG. 4, step S242 is executed, by the second output head 188, to generate the local predictions LPs according to the multi-resolution feature maps MFM. Reference is further made to FIG. 9, which is a schematic diagram illustrating the behaviors of the second output head 188 according to some embodiments of the disclosure. As shown in FIG. 2 and FIG. 9, the second output head 188 includes a region proposal network (RPN) 188*a*, an alignment module 188*b* and a classification module 188*c*. The region proposal network 188*a* is configured to generate region of interest (ROI) locations on the multi-resolution feature maps MFM. In some embodiments, the region proposal network 188*a* is able to propose some ROI locations, such as ROI locations ROI1, ROI2, ROI3 . . . . RO16 on the multi-resolution feature maps MFM. The alignment module 188*b* is configured to extract proposal regions PR from the multi-resolution feature maps MFM according to the region of interest locations ROI1, ROI2, ROI3 . . . . ROI6. The classification module 188*c* is configured to classify the proposal regions PR into a target group TAR or a non-target group NTG. The proposal regions PR in the target group TAR are utilized to generate the local predictions LPs by the second output head 188. Each of the local predictions LPs (referring to LP1-LP5 shown in FIG. 3) indicates a nodule predicted location in the medical image IMGi.

In some embodiments, the processor 140 is able to integrate the medical image IMGi, the global prediction GP and the local predictions LPs into output information INFO as shown in FIG. 3. In this case, output information INFO is able to show a probability that the medical image IMGi having a nodule and also potential locations of the nodules on the medical image IMGi. In some embodiments, the output information INFO can be displayed on the interface 160.

As shown in FIG. 3, in some embodiments, the output information INFO is in a format of an output image combining the probability corresponding to the global prediction GP and the potential locations local predictions LPs. In some other embodiments, the output information INFO can be in other formats, such as text descriptions, coordinate indications, drawings, tables, sound indications or a combination of aforesaid formats.

A user (e.g., a patient, a doctor, a thoracic radiologist, a nurse or a medical expert) can enter the medical image IMGi to the medical image detection system 100, and then observes/acknowledges the output information INFO through the interface 160. The output information INFO can help the user to understand an examination result reflecting on the medical image IMGi quickly. With the rising workload already posing a challenge for the thoracic radiologist, the medical image detection system 100 and the medical analyzation method 200 can be utilized as assistive tools to reduce missed nodules during chest radiograph analysis.

It is noticed that, to make sure that the first output head 186 and the second output head 188 can generate proper predictions about the medical image IMGi, the neural network model 180 must be trained in advance based on training data (e.g., known chest X-ray images and corresponding nodule labels in historical medical records). The following paragraphs will discuss a training procedure of the neural network model 180.

Figure 10:
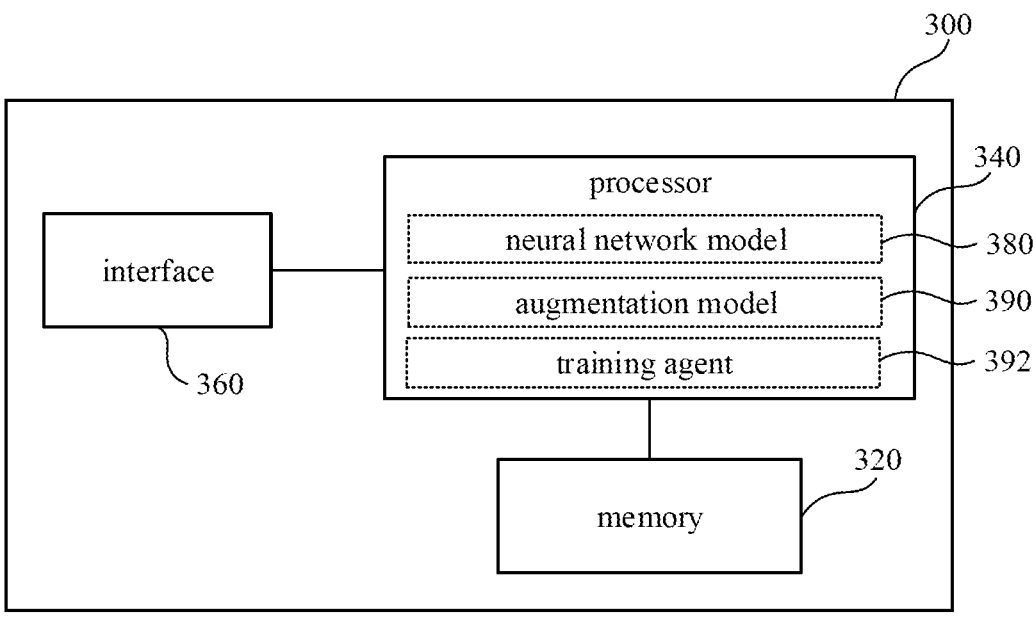
FIG. 10 is a schematic diagram illustrating a medical image detection system during training phase according to some embodiments of this disclosure.

Reference is further made to FIG. 10. FIG. 10 is a schematic diagram illustrating a medical image detection system 300 during training phase according to some embodiments of this disclosure. As shown in FIG. 10, the medical image detection system 300 includes a memory 320, a processor 340 and an interface 360. The processor 340 is configured to execute a neural network model 380. The memory 320, the processor 340, the interface 360 and the neural network model 380 as shown in FIG. 10 are similar to the memory 120, the processor 140, the interface 160 and the neural network model 180 discussed in aforesaid embodiments shown in FIG. 1 to FIG. 9. It is noticed that the processor 340 further executes an augmentation model 390 and a training agent 392 during a training phase of the neural network model 380.

Data augmentation is a technique that increases diversity in the training data to improve model generalization. The training data with a limited amount can be expended into a larger amount by the data augmentation technique. Some embodiments of the disclosure provide a dual head augmentation for applying individual augmentation strategies to each of output heads, to fully optimize each output head to their specific objectives.

Figure 11:
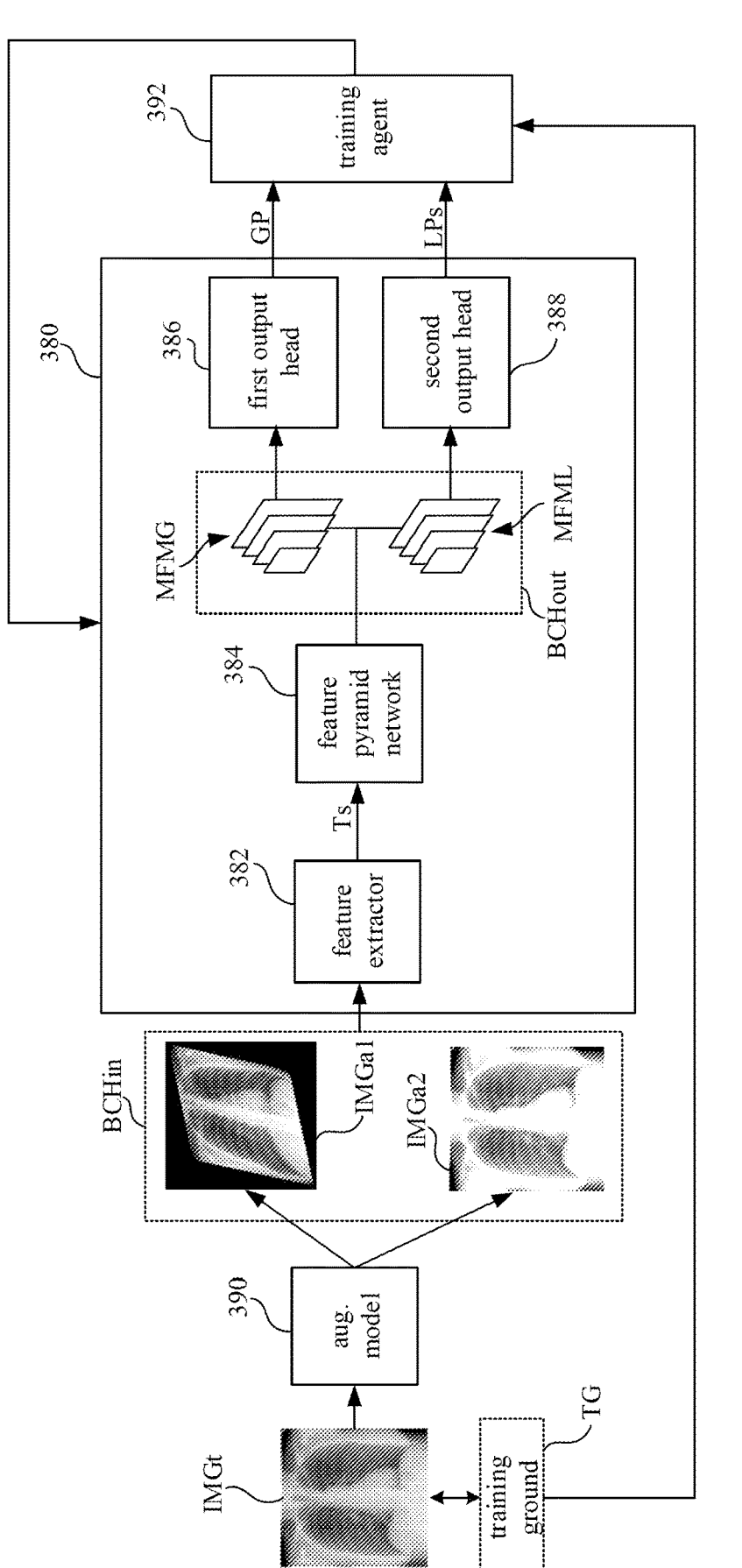
FIG. 11 is a schematic diagram illustrating behaviors of the augmentation model and the training agent during the training phase of the neural network model according to some embodiments.
Figure 12:
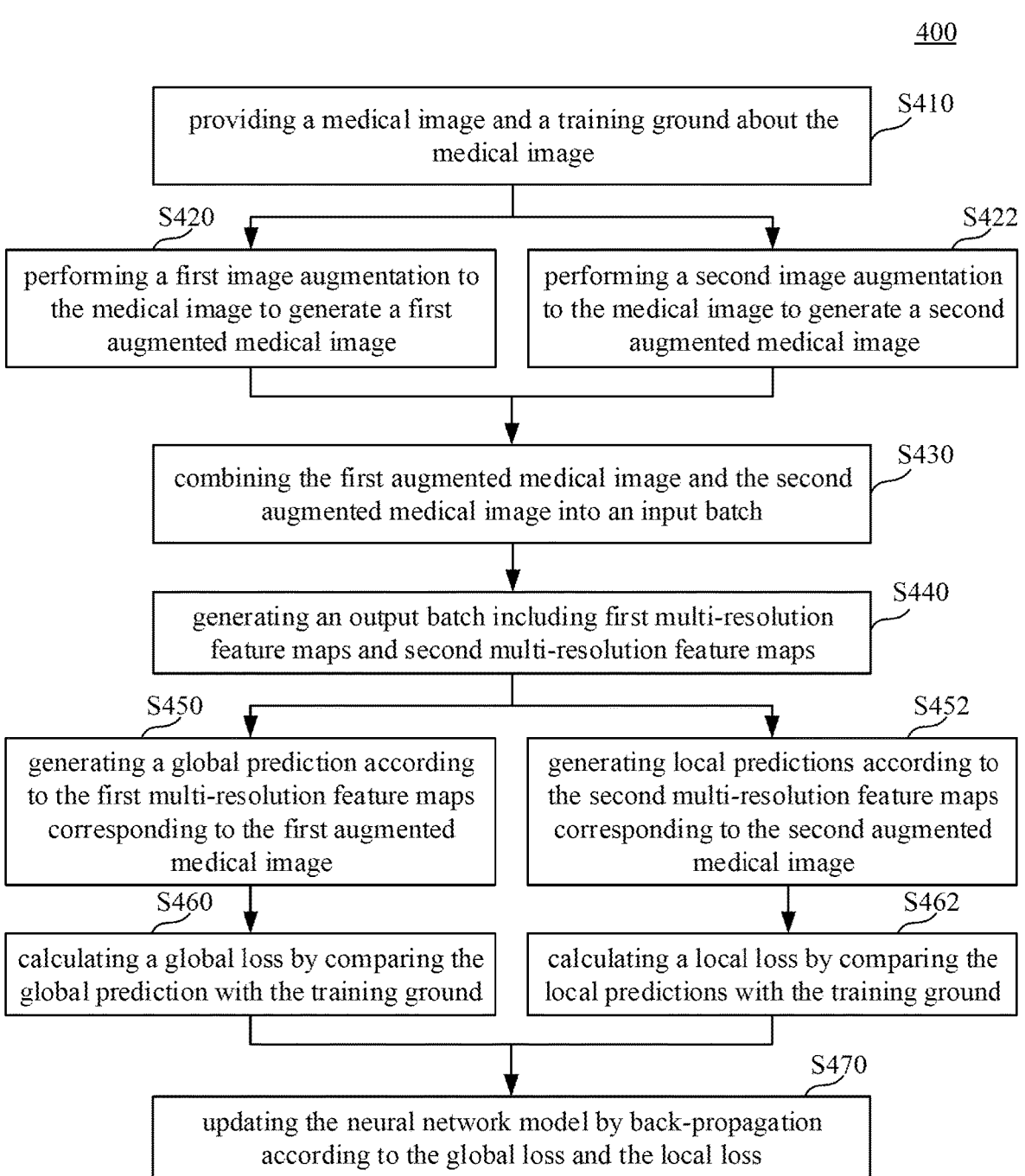
FIG. 12 is a flow chart diagram illustrating a training method suitable for training the neural network model executed by the medical image detection system shown in FIG. 10 according to some embodiments.

Reference is made to FIG. 11 and FIG. 12. FIG. 11 is a schematic diagram illustrating behaviors of the augmentation model 390 and the training agent 392 during the training phase of the neural network model 380. FIG. 12 is a flow chart diagram illustrating a training method 400 according to some embodiments. The training method 400 in FIG. 12 is suitable for training the neural network model 380 executed by the medical image detection system 300 shown in FIG. 10.

As shown in FIG. 11 and FIG. 12, step S410 is executed to provide a medical image IMGt and a training ground TG about the medical image IMGt. In this case, the medical image IMGt and the training ground TG can be obtained from a historical medical record. The medical image IMGt can be a real chest X-ray image, and the training ground TG (e.g., a medical judgment about nodule presence of the medical image IMGt and label boxes about found nodules) corresponding to the medical image IMGt can also be obtained from the historical medical record. The medical image IMGt is transmitted to the augmentation model 390.

As shown in FIG. 11 and FIG. 12, step S420 is executed, by the augmentation model 390, to perform a first image augmentation to the medical image IMGt to generate a first augmented medical image IMGa1. In addition, step S422 is executed, by the augmentation model 390, to perform a second image augmentation to the medical image IMGt to generate a second augmented medical image IMGa2.

In some embodiments, the first image augmentation in step S420 is performed by selecting at least one augmentation operation and applying the selected at least one augmentation operation to the medical image IMGt for generating the first augmented medical image IMGa1. In some embodiments, the augmentation operation is selected from some candidate augmentation operations, which include a random noise insertion, a random brightness adjustment, a random contrast adjustment, an image shearing, an image flipping and an image rotation. For demonstration, the image shearing is selected and applied to the medical image IMGt to generate the first augmented medical image IMGa1 as shown in FIG. 11. However, the disclosure is not limited thereto. One or more candidate augmentation operation(s) can be selected to perform in step S420 for generating the first augmented medical image IMGa1. For example, the random contrast adjustment and the image flipping can be selected together for generating the first augmented medical image (not shown in figures).

On the other hand, the second image augmentation in step S422 is performed by selecting at least one augmentation operation and applying the selected at least one augmentation operation to the medical image IMGt for generating the second augmented medical image IMGa2. For demonstration, the random brightness adjustment is selected and applied to the medical image IMGt to generate the second augmented medical image IMGa2 as shown in FIG. 11. However, the disclosure is not limited thereto. One or more candidate augmentation operation(s) can be selected to perform in step S422 for generating the second augmented medical image IMGa2.

In some embodiments, the first image augmentation in step S420 and the second image augmentation in step S422 are performed separately with different selected augmentation operations.

In some embodiments, during selecting augmentation operation, one of the candidate augmentation operations is selected according to a uniform sampling probability. In other words, when there are 6 different candidate augmentation operations (e.g., the random noise insertion, the random brightness adjustment, the random contrast adjustment, the image shearing, the image flipping and the image rotation), every one of the candidate augmentation operations has 1/6 chance to be selected, and only one of the candidate augmentation operations will be selected per augmentation operation.

In some other embodiments, during selecting augmentation operation, each of the candidate augmentation operations is selected individually according to a binomial sampling probability. In other words, when there are 6 different candidate augmentation operations, these six candidate augmentation operations have their own sampling probabilities to be selected, and more than one of the candidate augmentation operations can be selected per augmentation operation.

In some embodiments, in step S430, the first augmented medical image IMGa1 and the second augmented medical image IMGa2 are combined as an input batch BCHin together into the feature extractor 382 and the feature pyramid network 384.

The feature extractor 382 is configured for extracting intermediate tensors Ts from the first augmented medical image IMGa1 and the second augmented medical image IMGa2 in the input batch BCHin. The feature pyramid network 384 is associated with the feature extractor 382. As shown in FIG. 12, step S440 is executed, by the feature pyramid network 384, for generating an output batch BCHout, which include first multi-resolution feature maps MFMG (corresponding to the first augmented medical image IMGa1) and second multi-resolution feature maps MFML (corresponding to the second augmented medical image IMGa2) according to the intermediate tensors Ts.

As shown in FIG. 11 and FIG. 12, step S450 is executed, by the first output head 386, to generate a global prediction GP according to the first multi-resolution feature maps MFMG in the output batch BCHout. In addition, step S452 is executed, by the second output head 388, to generate local prediction LPs according to the second multi-resolution feature maps MFML in the output batch BCHout.

The behaviors of the first output head 386 and the second output head 388 in generating the global prediction GP and the local prediction LPs shown in FIG. 11 are similar to the behaviors of the first output head 186 and the second output head 188 discussed shown in aforesaid embodiments along with FIG. 2, FIG. 8 and FIG. 9, and not repeated here. A main difference between the current embodiments and previous embodiments is that, the first output head 386 generates the global prediction GP according to the first multi-resolution feature maps MFMG corresponding to the first augmentation image IMGa1, and the second output head 388 generates the local predictions LPs according to the second multi-resolution feature maps MFML corresponding to the second augmentation image IMGa2. In other words, the first output head 386 and the second output head 388 are trained under different augmentation operations.

As shown in FIG. 11 and FIG. 12, the global prediction GP and the local predictions LPs are transmitted to the training agent 392. Step S460 is executed, by the training agent 392, to calculate a global loss by comparing the global prediction GP with the training ground TG.

A primary purpose of the first output head 386 is to classify whether nodules are present in a given scan (i.e., the medical image IMGt). In some embodiments, the global loss $L_{global}$ is calculated by a weighted cross-entropy. When the training ground TG is true (with nodules presence), the global loss $L_{global}$ will be larger when the probability label of the global prediction GP is lower, and the global loss $L_{global}$ will be smaller when the probability label of the global prediction GP is higher. When the training ground TG is false (without nodules presence), the global loss $L_{global}$ will be larger when the probability label of the global prediction GP is higher, and the global loss $L_{global}$ will be smaller when the probability label of the global prediction GP is lower.

In addition, step S462 is executed, by the training agent 392, to calculate a local loss by comparing the local prediction LPs with the training ground TG. In some embodiments, the local loss $L_{local}$ is calculated according to following equation 1:

$$L_{local} = \ell_{obj} + \ell_{reg} + \ell_{cls} + \ell_{bbox} \qquad \text{(equation 1)}$$

During the training phase, a region proposal network (RPN) in the second output head 388 (referring the region proposal network 188a in the second output head 188 shown in FIG. 2 and FIG. 9) generates an objectness loss $\ell_{obj}$ from the background-foreground classification and a regression loss $\ell_{reg}$ from the distance computed between the proposed regions with their matched ground truth bounding boxes. A classification module (referring the classification module 188c in the second output head 188 shown in FIG. 2 and FIG. 9) in the second output head 388 generates a classification loss $\ell_{cls}$ during feature classification and a bounding box loss $\ell_{bbox}$ from the distance computed between the updated bounding boxes and their matched ground truth bounding boxes. In some embodiments, the training agent 392 can utilize a Smooth L1 Loss to calculate the regression loss $\ell_{reg}$ and the bounding box loss $\ell_{bbox}$ and the training agent 392 can utilize the Cross Entropy Loss to calculate the objectness loss $\ell_{obj}$ and the classification loss $\ell_{ds}$.

In some embodiments, the training agent 392 further calculate a multi-task loss $L_{multi}$ by a weighted sum of the global loss $L_{global}$ and the local loss $L_{local}$ as following equation 2:

$$L_{multi} = \lambda 1^* L_{global} + \lambda 2^* L_{local} \qquad \text{(equation 2)}$$

In the equation 2, $\lambda 1$ is a global loss weight, and $\lambda 2$ is a local loss weight.

As shown in FIG. 11 and FIG. 12, step S470 is executed, by the training agent 392, to update the neural network model 380 by back-propagation according to the global loss $L_{global}$ and the local loss $L_{local}$ (or according to the multi-task loss $L_{multi}$).

In classical image classification or object detection tasks, one augmentation strategy (i.e. a pre-defined set of stochastic transforms) is applied per training image. However, training with just one augmentation strategy per image on dual-head architecture can easily lead to one output head being particularly optimized while the other output head performing mediocrely. To fully optimize each of two output heads to their specific objectives, a dual-head augmentation as shown in FIG. 11 are provided in this disclosure. The augmentation model 390 is configured to apply two augmentation operations independently on two output heads. In this case, the augmentation operations can be optimized to train the first output head 386 and the second output head 388 separately for minimizing the global loss $L_{global}$ and the local loss $L_{local}$ (or the multi-task loss $L_{multi}$).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A medical image detection system, comprising:
   a memory, configured for storing a neural network model; and
   a processor, coupled with the memory, the processor being configured to execute the neural network model, the neural network model comprising:
      a feature extractor for extracting a plurality of intermediate tensors from a medical image, each of the intermediate tensors having a resolution respectively, wherein the feature extractor comprises a plurality of convolutional layers for generating the intermediate tensors with different resolutions, last three layers of the convolutional layers of the feature extractor are deformable convolution layers, sampling points of the deformable convolution layers are not distributed evenly in sample windows of the deformable convolution layers;
      a feature pyramid network (FPN), associated with the feature extractor, for generating a plurality of multi-resolution feature maps according to the intermediate tensors;
      a first output head for generating a global prediction according to the multi-resolution feature maps, the global prediction indicating whether any target object exists in the medical image; and a second output head for generating a plurality of local predictions according to the multi-resolution feature maps, each of the local predictions indicating a target object predicted location in the medical image, wherein the processor is configured to generate output information based on the medical image, the global prediction and the local predictions.

2. The medical image detection system as claimed in claim 1, wherein at least one of the multi-resolution feature maps is generated by the feature pyramid network according to at least two of the intermediate tensors from the feature extractor, the intermediate tensors comprises a first intermediate tensor with a higher resolution and a second intermediate tensor with a lower resolution, the feature pyramid network is configured to upsample the second intermediate tensor and merge with the first intermediate tensor into one of the multi-resolution feature maps.

3. The medical image detection system as claimed in claim 1, wherein the second output head comprises:

a region proposal network (RPN) configured to generate a plurality of region of interest (ROI) locations on the multi-resolution feature maps;

an alignment module configured to extract a plurality of proposal regions from the multi-resolution feature maps according to the region of interest locations; and a classification module configured to classify the proposal regions into a target group or a non-target group, so as to generate the local predictions according to the proposal regions classified in the target group.

4. The medical image detection system as claimed in claim 1, wherein the first output head comprises another plurality of convolutional layers, a linear layer and an activation layer, the activation layer is configured to generate the global prediction.

5. The medical image detection system as claimed in claim 1, wherein the medical image comprises an X-ray image, a computed tomography (CT) image or a magnetic resonance imaging (MRI) image about a chest region, an abdominal region or a head region, the target object comprises a nodule or a tumor.

6. A medical analyzation method, suitable for a medical image detection system executing a neural network model, the medical analyzation method comprising:

obtaining a medical image;

extracting, by a feature extractor of the neural network model, a plurality of intermediate tensors from the medical image, each of the intermediate tensors having a resolution respectively, wherein the intermediate tensors are generated with different resolutions by a plurality of convolutional layers of the feature extractor, last three layers of the convolutional layers of the feature extractor are deformable convolution layers, sampling points of the deformable convolution layers are not distributed evenly in sample windows of the deformable convolution layers;

generating, by a feature pyramid network of the neural network model, a plurality of multi-resolution feature maps according to the intermediate tensors;

generating, by a first output head of the neural network model, a global prediction according to the multi-resolution feature maps, the global prediction indicating whether any target object exists in the medical image;

generating, by a second output head of the neural network model, a plurality of local predictions according to the multi-resolution feature maps, each of the local predictions indicating a target object predicted location in the medical image; and generating output information based on the medical image, the global prediction and the local predictions.

7. The medical analyzation method as claimed in claim 6, wherein at least one of the multi-resolution feature maps is generated by the feature pyramid network according to at least two of the intermediate tensors from the feature extractor, the intermediate tensors comprises a first intermediate tensor with a higher resolution and a second intermediate tensor with a lower resolution, one of the multi-resolution feature maps is generated by:

upsampling the second intermediate tensor; and merging the upsampled second intermediate tensor and the first intermediate tensor into the one of the multi-resolution feature maps.

8. The medical analyzation method as claimed in claim 6, wherein the medical image comprises an X-ray image, a computed tomography (CT) image or a magnetic resonance imaging (MRI) image about a chest region, an abdominal region or a head region, the target object comprises a nodule or a tumor.

* * * * *